US005112717A

United States Patent [19]

Baxter et al.

[11] Patent Number: 5,112,717

[45] **Date of Patent: * May 12, 1992**

[54] METHOD AND APPARATUS FOR TREATING TONER IMAGE BEARING RECEIVING SHEETS

[75] Inventors: Carlton D. Baxter; Muhammad Aslam, both of Rochester, N.Y.

[73] Assignee: Eastman Kodak Company, Rochester, N.Y.

[ * ] Notice: The portion of the term of this patent subsequent to Jun. 11, 2008 has been disclaimed.

[21] Appl. No.: 409,194

[22] Filed: Sep. 19, 1989

[51] Int. Cl.[5] .................. G03G 13/20; B28B 11/08; B29C 59/00

[52] U.S. Cl. .................. 430/124; 430/98; 430/99; 264/293

[58] Field of Search .................. 430/98, 99, 124; 264/293

[56] References Cited

U.S. PATENT DOCUMENTS 3,591,276 7/1971 Byrne .
3,685,896 8/1972 Kaupp .
3,851,964 12/1974 Smith et al. .
3,893,761 7/1975 Buchan et al. .
3,904,786 9/1975 Takaguchi .................. 430/99
3,948,215 4/1976 Namiki .
4,095,879 6/1978 Katayama et al. .................. 355/326
4,337,303 6/1982 Sahyun et al. .
4,455,079 6/1984 Miwa et al. .
4,518,976 5/1985 Tarumi et al. .
4,531,825 7/1985 Miwa et al. .
4,582,750 4/1986 Lou .................. 428/409 X
4,611,902 9/1986 Schön .................. 355/285
4,639,405 1/1987 Franke .
4,657,831 4/1987 Ambro et al. .................. 430/14
4,669,860 7/1987 Elliot .................. 430/124 X
4,762,816 8/1986 Tamagawa et al. .................. 428/537.5 X
4,780,742 10/1988 Takahashi .
4,927,727 5/1990 Rimai et al. .................. 430/99
5,023,038 6/1991 Aslam et al. .................. 264/293

FOREIGN PATENT DOCUMENTS 0295901 12/1988 European Pat. Off. .
0301585 2/1989 European Pat. Off. .
63-92965 4/1988 Japan .

OTHER PUBLICATIONS

Bruce Prime, "Fixing of Electrophotographic Images", Photographic Engineering & Science, vol. 27, No. 1, Jan./Feb. 1983 pp. 19–25.
U.S. Serial No. 230,394 filed Aug. 9, 1988 Rimai et al "Thermally Assisted Transfer of Small Electrostatographic Toner Particles".
U.S. Serial No. 345,160 filed Apr. 28, 1989 Rimai et al "Method of Non-Electrostatically Transferring Toner".

*Primary Examiner*—Marion E. McCamish
*Assistant Examiner*—Stephen C. Crossan
*Attorney, Agent, or Firm*—Leonard W. Treash, Jr.

[57] ABSTRACT

A toner bearing thermoplastic layer on a receiving sheet is textured or the gloss is improved by heating the thermoplastic layer from the rear to its glass transition temperature and contacting said sheet with a texturizing surface under sufficient pressure to texturize the layer. Offset of the thermoplastitc onto the pressure member contacting it is inhibited by not independently heating that member substantially above the glass transition temperature of the thermoplastic layer.

14 Claims, 1 Drawing Sheet

METHOD AND APPARATUS FOR TREATING TONER IMAGE BEARING RECEIVING SHEETS

CROSS-REFERENCE TO RELATED APPLICATIONS

This application is related to co-assigned:

U.S. patent application Ser. No. 07/405,175, filed Sep. 11, 1989, METHOD AND APPARATUS FOR TEXTURIZING TONER IMAGE BEARING RECEIVING SHEETS AND PRODUCT PRODUCED THEREBY, Muhammad Aslam et al now U.S. Pat. No. 5,023,038 issued Jun. 11, 1991.

U.S. patent application Ser. No. 07/405,258, filed Sep. 11, 1989, TONER FIXING METHOD AND APPARATUS AND IMAGE BEARING RECEIVING SHEET, Donald S. Rimai et al.

TECHNICAL FIELD

This invention relates to the finishing of toner images and more particularly to a method and apparatus for imparting a texture to or improving the gloss of toner image bearing receiving sheets.

BACKGROUND ART

Traditional photofinishing operations for photographic color images provide the consumer with a variety of textures to the surface of the image in addition to the usual glossy print. In traditional silver halide photography the texture is applied to the surface of the receiving paper in its manufacturing process and survives liquid processing and drying in the photofinishing operation.

In electrophotography, multicolor images having resolution and other qualities comparable to those of silver halide photography have been produced in the laboratory. One reason such systems have not been commercially practical is they have generally required liquid developing for high quality. However, recent advances in fine particle dry toners have made low grain, high resolution images feasible with dry systems.

One of the problems associated with such systems is that of providing the customer a variety of textures to the image comparable to that available with ordinary photofinishing. Highest quality dry color imaging is accomplished with a receiving sheet having a thermoplastic layer which can be texturized. However, the fixing and other treatments associated with dry electrophotography involve the application of heat and pressure which would adversely affect any texture imparted to such a receiving sheet in its manufacturing operation.

Any texturizing process must be done without the image or thermoplastic layer offsetting onto the texturizing surface. Fusing oils used in copiers leave image defects that are unacceptable with photographic quality prints.

U.S. Pat. No. 4,639,405 shows a post-treatment step to add gloss to a toner image carried on paper after ordinary fusing. The fixed image-bearing paper is dried and then pressed between a pair of heated rollers which increase the gloss of the image. At least one of the rollers has a resin coating to provide some width of nip to aid in heat transfer. A purpose for the drying step is to prevent blistering from steam escaping around the nip when coated paper is used as the receiving sheet.

U.S. Pat. No. 4,780,742 shows a method of increasing the gloss of a fixed toner image by coating it with a thin sheet in the presence of heat and pressure. The thin sheet packs the image and fuses it together, increasing gloss and removing surface roughness. The sheet is cooled and peeled off. The image appears to be fused on top of the support which has a principle object of providing less scattering for color images on transparencies.

European patent application 0 301 585 published Feb. 1, 1989, shows a glazing sheet used to increase the gloss of either a toner image on a paper backing or a dye and developer in a thermoplastic coating. The glazing sheet is pressed against the paper sheets with moderate pressure and the dye-thermoplastic sheets with substantial pressure. The glazing sheet can be either smooth for a high gloss or dull for a low gloss finish. In one embodiment, the glazing sheet has both high and low gloss sections that can be selected.

U.S. Pat. No. 4,337,303 suggests a method of thermal transfer involving bringing a receiving sheet having a thermoplastic coating into contact with fine toner images in the presence of sufficient heat to soften the thermoplastic coating. The toner is said to be "encapsulated" by the thermoplastic coating under moderate pressure.

DISCLOSURE OF THE INVENTION

It is an object of the invention to provide a method and apparatus for treating a thermoplastic layer on a receiving sheet, which layer carries a toner image, to produce a texture or improve the gloss in said layer.

This and other objects are accomplished by the method of positioning said receiving sheet between a pair of pressure members, one of said pressure members having a texturizing or glossing surface, heating said pressure member contacting the side of the sheet opposite said thermoplastic layer to a temperature sufficient to raise or maintain said thermoplastic layer to or above its glass transition temperature without independently heating the pressure member contacting the thermoplastic layer to a surface temperature greater than 10° C. above said glass transition temperature, and applying sufficient pressure between the pressure members to impart a texture to or improve the gloss of the thermoplastic layer.

According to a preferred embodiment the pressure members are a pair of rollers, the roller touching said thermoplastic layer being unheated and having a texturizing surface.

With such a structure we have found that a texture can be imparted in the softened thermoplastic layer or the gloss of said layer enhanced and the thermoplastic layer will release from the contacting surface without the use of fusing oils. We believe this release to be due to the fact that the heating of the thermoplastic layer is not accomplished primarily by the surface contacting it and therefore the outer molecules of the thermoplastic layer do not reach a temperature substantially higher than the rest of the layer.

BRIEF DESCRIPTION OF THE DRAWINGS

In the detailed description of the preferred embodiment of the invention presented below reference is made to the accompanying drawings, in which.

THE BEST MODE OF CARRYING OUT THE INVENTION

Figure 1:
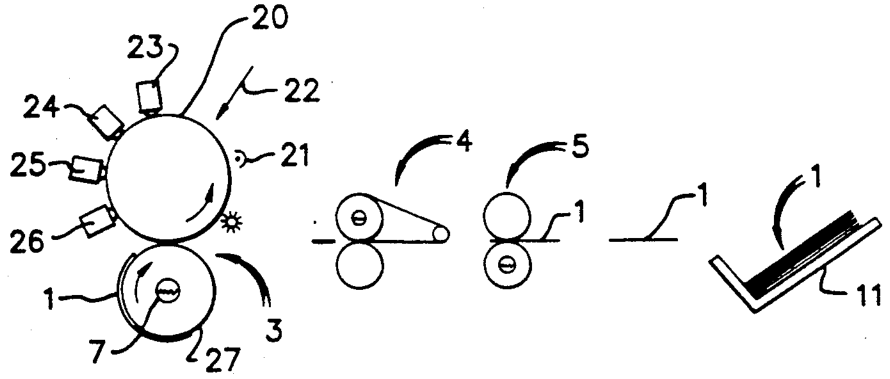
FIG. 1 is a side schematic view of an apparatus for producing finished multicolor toner images.

According to FIG. 1 a receiving sheet 1 is fed along a path through a series of stations. The receiving sheet 1 is shown in section in FIG. 2 and has a paper support 10 with a readily softenable thermoplastic layer 9 coated on its top side. Preferably, the paper support 10 also has a curl preventing coating 8 on its bottom side. These materials will be explained in more detail below.

Receiving sheet 1 is fed through a path past an image transfer station 3, a fixing station 4, texturizing station 5 and into a receiving hopper 11.

A multicolor toner image can be formed by a number of means on receiving sheet 1. For example, according to FIG. 1, a photoconductive drum 20 is uniformly charged at a charging station 21 exposed by a laser, an LED or an optical exposure device at exposure station 22 and toned by different color toning stations 23, 24, 25 and 26. Consistent with conventional color electrophotography, consecutive images are toned with different colors by toning stations 23–26. The consecutive images are then transferred in registry to the surface of receiving sheet 1 at transfer station 3 where sheet 1 is secured to transfer roller 27 and repetitively brought into transfer relation with the images to form a multicolor toner image thereon. Single color images can also be formed by the same apparatus.

Extremely high quality electrophotographic color work with dry toner particles requires extremely fine toner particles. For example, images comparable to photographic color prints have been produced with toner particles having an average diameter less than 8 μM, and especially less than 3.5 μM. Because of difficulties encountered in electrotatically transferring such small toner particles, transfer station 3 is preferably of the thermally assisted type, in which transfer is accomplished by heating both the toner and the thermoplastic layer of the receiving sheet causing preferential adherence between the toner and receiving sheet as compared to the toner and whatever surface is carrying it, in this instance photoconductive drum 20. For this purpose transfer roller 27 is heated by a lamp 7 which heats the thermoplastic layer 9 to its glass transition temperature which assists in the transfer of the toner to layer 9 by partially embedding the toner in layer 9.

A multicolor image can also be formed using an intermediate drum or web to which two or more color toners are transferred in registry and then transferred as a single multicolor image to a receiving sheet. Sheet 1 can also receive a multicolor image directly from drum 20 in a single transfer if that image is formed on photoconductive drum 20 by a known process which exposes and develops second, third and fourth color images on top of previously formed color images. In summary, any of a number of known techniques may be used to provide a multicolor image of dry, extremely fine toner particles on or slightly embedded in the upper thermoplastic surface of receiving sheet 1.

Figure 2:
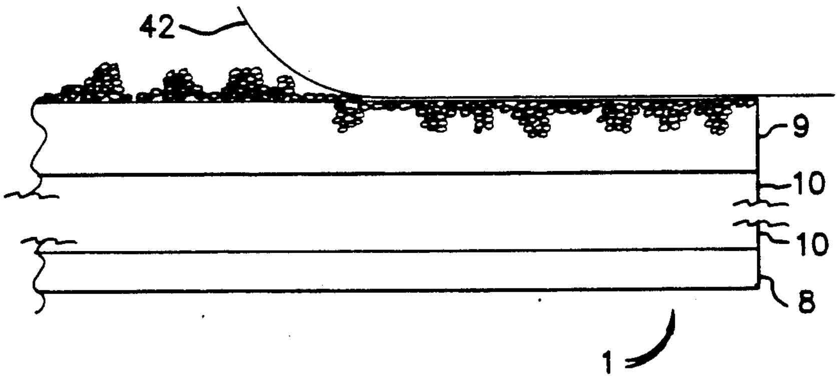
FIG. 2 is a side section greatly magnified illustrating the fixing of multicolored toner images as carried out by the apparatus of FIG. 1.

Referring to FIG. 2, these finely divided toner particles (exaggerated in size in FIG. 2) have a tendency to extend in layers a substantial and varying height above the surface of receiving sheet 1. Ordinary pressure roller fusing has a tendency to flatten somewhat the layers of toner, but also spreads such layers, increasing substantially the granularity of the image and noticeably impairing its quality. Further, the fine toner has a tendency to offset on the pressure fuser unless fusing oils are used. Such fusing oils, while acceptable for ordinary copying work, leave blotches on the sheet surface that are unacceptable for photographic quality imaging. Pressure roller fusers using one hard roller and one more resilient roller to create a substantial nip for acceptable heat transfer also leave a noticeable relief image in the print, which for photographic quality is an unacceptable defect. With receiving sheets that are coated on both sides, blistering with such fusers is a significant problem.

Figure 3:
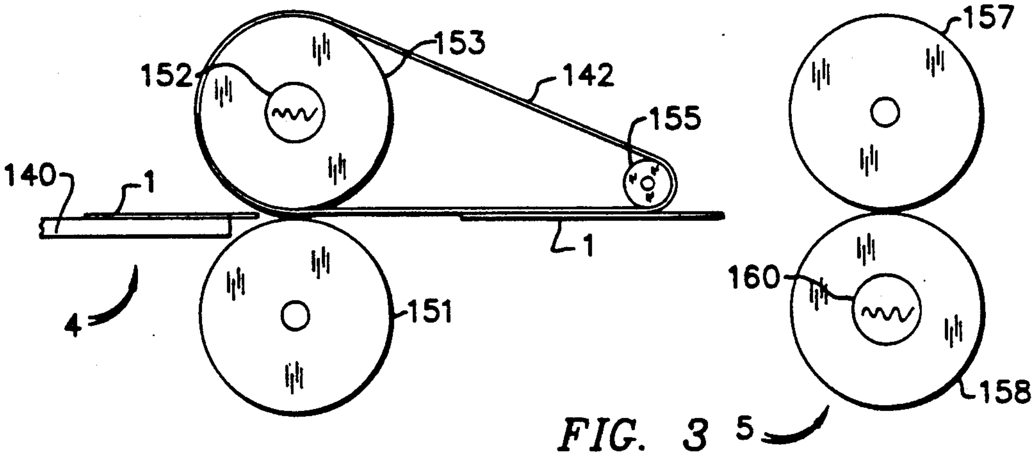
FIG. 3 is a side section of a fixing and texturizing apparatus incorporated in the apparatus of FIG. 1.

Fixing station 4 is best shown in FIG. 3, where receiving sheet 1 is heated by preheating device 140 sufficiently to soften or to approach softening thermoplastic layer 9 on paper support 10. Preheating device 140 is shown as an ordinary conduction heating device which heats thermoplastic layer 9 through paper support 10. Other known heating devices could be used, for example, an infrared heating device on the upper side of receiving sheet 1 which directly heats layer 9. Receiving sheet 1 with thermoplastic layer 9 heated to or nearly to its softening point, now passes between a backing roller 151 and a ferrotyping web 142 pressed against receiving sheet 1 by a roller 153 which is also heated to prevent the cooling of thermoplastic layer 9 below its softening point or to finish raising the temperature of the thermoplastic to or above its glass transition temperature. Rollers 151 and 153 are urged together with substantial force to create substantial pressure between ferrotyping web 142 and toner image and layer 9.

With layer 9 softened by heat, the toner is pushed into it, totally embedding itself in layer 9. This action is shown best in FIG. 2, where the toner image is first shown, at the left, to have substantial relief characteristics as it is piled in layers on top of now softened layer 9. Although the toner image is shown as entirely on top of layer 9, if thermal assisted transfer was used at transfer station 3, some of the toner may be already partially embedded in layer 9. However, at the present state of the art, that transfer step with most materials is not capable of completely fixing the toner image. Accordingly, as shown in FIG. 2, ferrotyping web 142 pushes all of the layers of toner into thermoplastic layer 9 allowing the thermoplastic to flow over the toner thereby fixing the image. It has been found that with substantial pressures and appropriate temperatures this method of embedding toner in the layer 9 provides an image which is well fixed, has high gloss, and is free of noticeable relief. Because the toner is fixed by being pushed into the layer 9, it does not spread and does not destroy the sharpness or noticeably increase the granularity provided by the fine toner particles.

In conventional fusing systems one (or both) roller is somewhat compliant to create a wide nip to allow sufficient heating area. Unfortunately, the wide nip prevents obtaining sufficiently high pressure to remove the relief in these materials. Such conventional fusing systems typically provide gloss levels less than 20. Also, when using coated papers, the wide nip causes overheating, and thereby contributes to blisters as the receiving sheet leaves the nip.

Similarly, conventional fusing systems use a fusing oil to prevent adhesion of the image to the roller contacting it. With a thermoplastic layer on the receiving sheet, such adhesion is even more likely. Unfortunately, the use of oil adversely affects image quality and leaves an oily coating on the receiver which is unacceptable in photographic grade reproduction.

According to FIG. 3 the ferrotyping web 142 contacts the image and the thermoplastic coating over a substantial distance. The ferrotyping web 142 is a smooth, hard web having low surface energy. Preferably, it should have a surface energy less than 47 ergs/cm$^2$, preferably less than 40 ergs/cm$^2$ and a Youngs modulus of $10^8$ Newtons/m$^2$ or greater. The FIG. 3 embodiment shows web 142 mounted around roller 153, and a separating roller 155.

Rollers 151 and 153 apply substantial pressure to the interface between ferrotyping web 142 and receiver 1.

Rollers 151 and 153 are preferably hard metallic rollers to maintain pressures in the nip not ordinarily obtainable using compliant rollers. For good results the pressure should be 100 pounds per square inch or greater. Above 100 psi further improvement is seen with greater pressure. For example, sufficient force can be placed between rollers 151 and 153 if both have a hard metallic surface to create a pressure in the nip between web 142 and sheet 1 in excess of 300 pounds per square inch. Excellent results have been obtained at pressures in excess of 1,000 pounds per square inch.

Preheating device 140 is used to soften the thermoplastic layer 9 on the receiving sheet 1. One or both of rollers 151 and 153 is also heated to raise or maintain the temperature of the thermoplastic layer above its glass transition temperature which permits forcing the toner into the thermoplastic layer. Preferably, roller 153 is hard and is heated by lamp 152, and web 142 wraps a portion of roller 153 to allow roller 153 to preheat web 142.

After receiving sheet 1 has passed through the area of heaviest pressure and heat between rollers 151 and 153, both it and ferrotyping web 142 begin to cool. As the thermoplastic layer on receiving sheet 1 cools below its glass transition temperature, the toner becomes fixed in the thermoplastic layer and loses its tendency and the tendency of the thermoplastic layer to release with web 142. Therefore, when web 142 is separated from receiving sheet 1 at separating roller 155, the image and thermoplastic layer 9 are not retained by it. The resulting image is well fixed, has high resolution and has a high gloss. The toner has become entirely embedded in the thermoplastic and the thermoplastic has formed over it. The thermoplastic prevents light scattering by the toner particles and provides the high gloss, from ferrotyping web 142, while the toner does not flow or spread and maintains its integrity providing substantially its original low granularity.

Ferrotyping web 142 can be made of a number of materials. Both metals and plastics have been successfully used. For example, a highly polished stainless steel belt, an electroformed nickel belt, and a chrome plated brass belt both have both good ferrotyping and good release characteristics. However, better results have been obtained with conventional polymeric support materials such as polyester, cellulose acetate and polypropylene webs. Materials marketed under the trademarks Estar, Mylar and Kapton F give gloss levels extending into the 90's. Metal belts coated with heat resistant low surface energy polymers, such as highly crosslinked polysiloxanes, have also been found to be effective in this process.

The thermoplastic coating 9 is heated above its glass transition temperature by the preheating device 40 and the rollers, preferably roller 153 and ferrotyping web 142. With a thermoplastic layer 9 having a glass transition temperature between 45° and 70° C., we have obtained good results raising its temperature to approximately its glass transition temperature by preheating alone. It is preferable, although not necessary, that the toner have a glass transition temperature above that of the thermoplastic, for example, between 55° and 70° C. If the ferrotyping web is maintained at 105° C. as it approaches the nip, some of the toner will soften. But at any of these temperatures, layer 9 is more soft and the toner embeds without spreading. If separation occurs only after the thermoplastic is again below the glass transition temperature, exact control over the temperature in the nip is not critical.

It is well known in the photographic and printing arts to coat opposite sides of image bearing sheets with similar materials to prevent those materials from curling. Thus, while uncoated paper would not curl, once thermoplastic layer 9 is added, the difference in the reaction to heat and humidity of paper and the thermoplastic will tend to cause the paper to curl in changing conditions. For this reason, layer 8 is added to the opposite side which offsets the curl producing tendency of layer 9 and also keeps moisture in the paper, making it more like most environments.

In the photographic art, layer 8 would ordinarily be of the exact same material and thickness as layer 9. However, we have found that curl can be prevented by using a similar material to that of layer 9, but with some properties advantageously different. More specifically, in the process shown in FIG. 1 a material having similar curl characteristics to layer 9 can be applied as layer 8 but with a significantly higher melting point. For example, a polyethylene or polypropylene layer 8 having softening and melting points 115° C. or greater and of proper thickness will substantially counter the curl tendency of a thermoplastic coating 9 having a glass transition temperature between 45° and 70° C. and of a particular thickness. With such a structure, offset of layer 8 onto roller 151, preheating device 40 and, perhaps most important, transfer roller 27 is prevented. If layer 8 were of the same material as layer 9, it would be necessary to either provide a liquid release agent to roller 151 (and transfer roller 27 and preheating device 40) or provide an endless web similar to web 142 for contact with layer 8. To exactly counter the tendency of layer 9 to curl the paper in one direction, the density of layer 8 can be adjusted. Such precision does not appear to be necessary.

For example, high grade photographic paper stock coated with a 1.0 mil polyethylene coating on its back side was coated on the other side with a 0.5 mil coating of a polystyrene thermoplastic, marketed by Goodyear under the tradename Pliotone 2015 which has a glass transition temperature between 50° and 60° C. The polyethylene has melting and glass transition temperatures above 115° C. A multicolor toner image of toners having a glass transition temperature between 55° and 65° C. was formed on the thermoplastic layer. The sheet was heated to between 55° and 60° C. by preheating device 140 and fed at a rate of 35 mm./sec between a ferrotyping web 142 of 3 mil polypropylene having a melting point in excess of 200° C. Web 142 was backed by a metal roller 153 heated to a temperature of 105° C. by a lamp 152. The receiving sheet was backed by an unheated metal roller 151. A pressure of approximately 300 psi was applied. High quality prints were obtained with very low granularity using toners of average diameter of approximately 3.5 microns. Neither surface of the receiving sheet had a tendency to offset onto web 142 or roller 151. The sheets did not have a tendency to curl when subjected to normal temperature and humidity changes. With a preheating device long enough to allow contact with receiving sheet 1 of at least one second, good results at faster times (in excess of 200 mm./sec) were also achieved. Without preheating device 140, it was difficult to get good results above 10 mm./sec.

With most materials, when the receiver 1 leaves web 142 at roller 46 it has a permanent high gloss above or approaching 90. Textures, such as "matte", "satin" or "silk screen", can be imparted to the surface of receiver 1 by applying a texturizing surface to web 142, thereby both fixing and texturizing the surface in one step. However, for some materials and finishes, especially high quality multicolor images, the lack of smoothness of a texturizing web prevents it from doing as good a job of embedding toner in layer 9 as a smooth hard ferrotyping web. For such materials it is best to embed at station 4 and texturize at station 5 in a separate step.

Referring to FIG. 3 texturizing station 5 includes a pair of pressure members, for example, an unheated roller 157 and a heated roller 158 which roller is heated by a lamp 160. Unheated roller 157 includes a texturizing surface which has been treated to give it the texturizing characteristic required. For example, it can be sandblasted to impart a coarse texture. Electroforming can also be used to impart any of a variety of textures. As shown, roller 157 is a steel roller sandblasted to impart a coarse texture and roller 158 is a smooth aluminum roller with an aluminum oxide finish. The receiving sheet 1 with a toner image embedded in thermoplastic layer 9 is fed into the nip between rollers 157 and 158 with layer 9 up. The surface of roller 158 is heated to a temperature sufficient to heat layer 9 through support 10 and curl preventing layer 8 to again raise the temperature of thermoplastic layer 9 to its glass transition temperature or higher.

Although some texturizing can be done at nip pressures as low as 100 pounds per square inch, we found better results, especially with multicolor images, with nip pressures much higher, for example, pressures above 1000 pounds per square inch.

With this structure the desired texture was imparted to the thermoplastic layer and remained permanently in it. Remarkably, the thermoplastic layer and the toner image did not offset onto roller 157. It is believed that this is due to the fact that the texturizing roller 157 was unheated, except for whatever heat is transmitted from the receiving sheet and the pressure roller 158. With the heating being accomplished by roller 158 through the support 10 all of thermoplastic layer 9 can be heated above its glass transition temperature without locally overheating the portion of the thermoplastic layer which contacts roller 157. Good results were obtained with a surface temperature on roller 158 of approximately 105° C. Curl preventing layer 8 should be a material with a melting point above this temperature, for example, polyethylene, polypropylene, or the like.

Good results were obtained by not independently heating the roller surface contacting the thermoplastic layer 9, and this approach is preferred. However, it is within the concept of the invention to mildly heat roller 157, for example, by a lamp inside roller 157, to a temperature not substantially above the glass transition temperature of layer 9. Offset does not occur with most materials with the surface of roller 157 heated to a temperature up to 10° C. above the glass transition temperature of layer 9. With the narrow nip provided by two hard rollers this temperature would be inadequate at reasonable speeds to heat enough of layer 9 to its glass transition temperature to texturize layer 9. Most of the heat must come from the hotter roller 158, which does not locally overheat the surface of layer 9.

U.S. Pat. No. 5,023,038 Aslam et al noted above teaches that a texture can be imparted to layer 9 with a texturizing surface on either pressure member, i.e., either roller 157 or roller 158. Thus, either roller may be texturizing in this case.

As with fixing station 4, receiving sheet 1 can be preheated by a preheating device (not shown) similar to device 140. However, if receiving sheet 1 cools down only slightly below its glass transition temperature before it separates from web 142 it can be easily heated above its glass transition temperature by roller 158 without a preheating device as part of texturizing station 5.

This invention also may be used to improve the gloss on layer 9. It has been shown that for many materials an improvement in gloss and its permanence can be achieved by a second treatment after fixing station 4. Thus, this invention can be used with both rollers 157 and 158 having smooth surfaces.

Further, with some materials and applications, the fixing station 4 may be eliminated altogether and the station 5 used to both embed the toner and texturize or gloss layer 9.

Although it is preferred that both rollers are hard metal rollers, some applications can function with lower pressures allowing one or both of the rollers to have a thin elastomeric surface providing a broader nip and allowing better heat transfer. Similarly, either roller can be coated with a low surface energy material such as Teflon or a silicone resin to further reduce the tendency of either layer to offset.

The invention has been described in detail with particular reference to a preferred embodiment thereof, but it will be understood that variations and modifications can be effected within the spirit and scope of the invention as described hereinabove and as defined in the appended claims.

We claim:

1. A method of treating a thermoplastic layer on a receiving sheet, said layer having a surface which defines an outside surface of said sheet and in which surface is embedded a fixed toner image, said method comprising:

positioning said receiving sheet between a pair of pressure members, one of said pressure members contacting said thermoplastic layer and having a hard texturizing or glossing surface, heating said pressure member contacting the side of said sheet opposite said thermoplastic layer to a temperature sufficient to raise or maintain said thermoplastic layer to or above its glass transition temperature without independently heating the pressure member contacting said thermoplastic layer to a surface temperature greater than 10° C. above said glass transition temperature, and applying sufficient pressure between said pressure members to impart a texture to or enhance the gloss of said thermoplastic layer.

2. The method according to claim 1 wherein said pressure members are a pair of rollers, the roller contacting said theroplastic layer being unheated.

3. The method according to claim 1 wherein said receiving sheet has a curl preventing layer opposite said thermoplastic layer having a melting point sufficiently above the temperature of the heated pressure member contacting it not to offset onto said heated pressure member.

4. A method of treating a thermoplastic layer on a receiving sheet and a toner image fixed and embedded in an outside surface of said layer which outside surface also defines an outside surface of said receiving sheet, said method comprising:

embedding said toner in said thermoplastic layer by applying pressure to said toner while said thermoplastic layer is heated to or above its glass transition temperature, positioning said receiving sheet between a pair of pressure members, the pressure member contacting said thermoplastic layer having a hard, substantially metallic texturizing surface, heating said pressure member contacting the side of said sheet opposite said thermoplastic layer to a temperature sufficient to raise or maintain said thermoplastic layer to or above its glass transition temperature without independently heating the pressure member contacting said thermoplastic layer to a surface temperature greater than 10° C. above said glass transition temperature, and applying sufficient pressure between said pressure members to impart a texture to said thermoplastic member.

5. The method according to claim 4 wherein said embedding step includes the step of positioning said thermoplastic layer in contact with a smooth hard surface under sufficient pressure to embed said toner in said heated thermoplastic layer and to apply a gloss to the surface of said layer.

6. The method according to claim 5 wherein said method also includes the step of separating said sheet from said smooth hard surface before positioning it between said pressure members.

7. The method according to claim 4 wherein said pressure members are a pair of rollers, one of said rollers being unheated and having a texturizing surface contacting said thermoplastic layer.

8. The method according to claim 4 wherein said receiving sheet has a curl preventing layer opposite said thermoplastic layer having a melting point sufficiently above the temperature of the heated pressure member contacting it not to offset onto said heated pressure member.

9. The method according to claim 5 wherein said smooth hard surface is a web having a heated backing roller which heats the thermoplastic layer through said web.

10. The method according to claim 6 wherein said smooth hard surface is a web having a heated backing roller which heats the thermoplastic layer through said web and said sheet is separated from said smooth hard surface by allowing said thermoplastic layer to cool while in contact with said surface and then separating said sheet therefrom.

11. The method according to claim 6 wherein said smooth hard surface is a web having a heated backing roller which heats the thermoplastic layer through said web and said sheet is separated from said smooth hard surface by allowing said thermoplastic layer to cool while in contact with said surface and then separating said sheet therefrom and wherein said pressure members are a pair of rollers, one of said rollers being unheated and having a texturizing surface contacting said thermoplastic layer.

12. Apparatus for treating a thermoplastic layer on a receiving sheet, said layer having an outside surface that also defines an outside surface of the sheet, and said surface having a multicolor toner image fixed and embedded therein, said apparatus comprising:

a pair of pressure members for receiving the receiving sheet, one of said pressure members contacting said thermoplastic layer and having a hard, substantially metallic texturizing surface, means for heating said pressure member contacting the side of said sheet opposite said thermoplastic layer to a temperature sufficient to raise or maintain said thermoplastic layer to or above its glass transition temperature without independently heating the pressure member contacting said thermoplastic layer, and means for applying sufficient pressure between said pressure members to impart a texture to said thermoplastic layer.

13. Apparatus according to claim 12 wherein said pressure members are a pair of rollers, and the roller contacting said thermoplastic layer is unheated.

14. Apparatus according to claim 12 wherein both of said pressure members are rollers having metallic surfaces.

* * * * *